April 1, 1924.
E. B. HOFF
1,488,498
DYNAMO ELECTRIC MACHINERY
Filed May 2, 1923
2 Sheets-Sheet 1
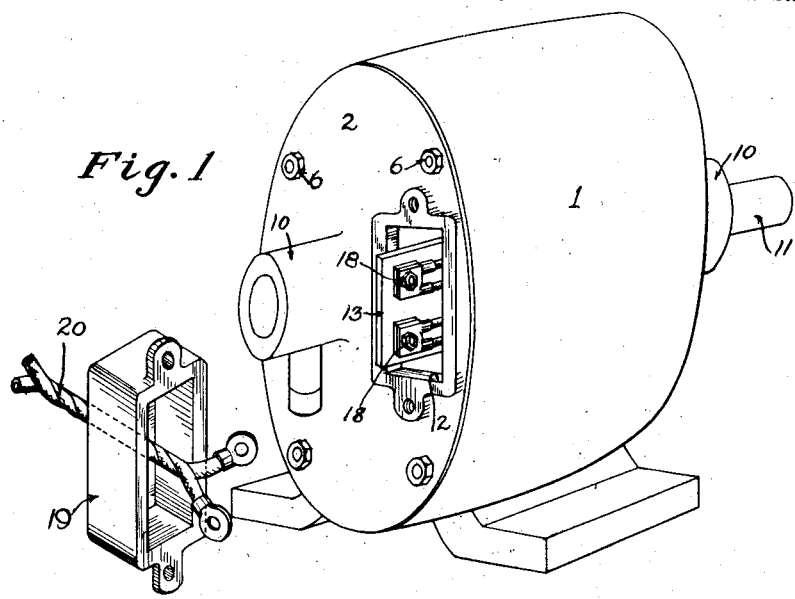
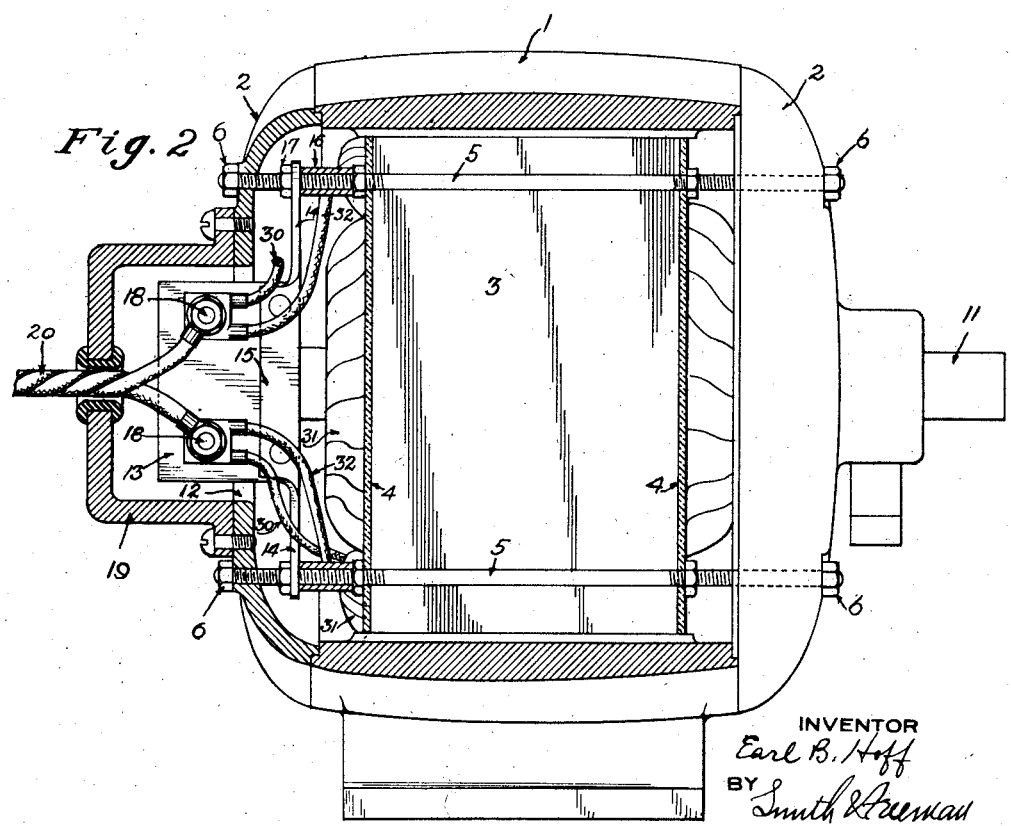
INVENTOR
Earl B. Hoff
BY Smith & Freeman
ATTORNEYS

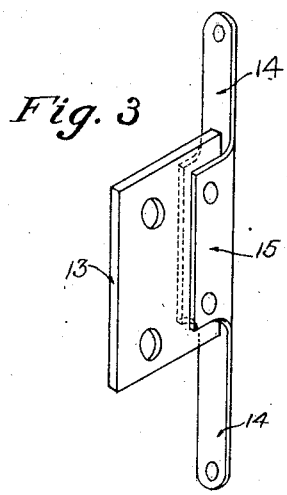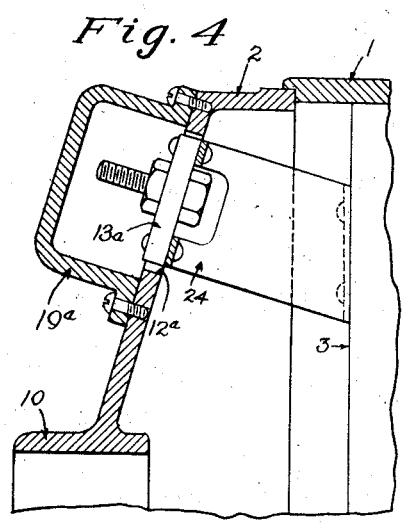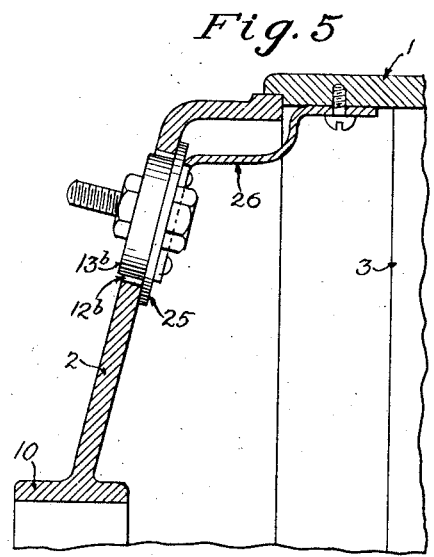

Patented Apr. 1, 1924.

1,488,498

UNITED STATES PATENT OFFICE.

EARL B. HOFF, OF EAST CLEVELAND, OHIO, ASSIGNOR TO THE AZOR MOTOR MANUFACTURING COMPANY, OF CLEVELAND, OHIO, A CORPORATION OF OHIO.

DYNAMO-ELECTRIC MACHINERY.

Application filed May 2, 1923. Serial No. 636,100.

*To all whom it may concern:*

Be it known that I, EARL B. HOFF, a citizen of the United States, residing at East Cleveland, in the county of Cuyahoga and State of Ohio, have invented a certain new and useful Improvement in Dynamo-Electric Machinery, of which the following is a full, clear, and exact description, reference being had to the accompanying drawings.

This invention relates to dynamo-electric machinery, and especially to small motors and generators such as are often used to drive light machinery like washing machines, ironing machines, computing machines, and other mechanical devices employing only a small amount of power; or for generating current in automobiles, motor boats, farm-appliances and the like. Practically all these uses demand a maximum of simplicity and cheapness of manufacture combined with a construction which shall be largely dust and water-proof, and it is often of advantage to secure access to the internal connections for the purpose of reversing the direction of rotation, changing the speed, etc.

The objects of this invention are the provision of a terminal block which shall be supported from the interior of the device and project into such relation with the exterior of the casing as shall enable the electric connections to be made with equal facility whether the machine be assembled or dismantled; while at the same time retaining the features of simplicity, cheapness, and tight enclosure.

In the drawings accompanying and forming a part of this application I have shown certain simple mechanical forms in which my inventive idea can be embodied, although it will be understood that these are merely illustrative of the general principles of my invention and are not exhaustive of its applications. Fig. 1 is a perspective view of a small motor provided with my improvements, the terminal-housing having been removed; Fig. 2 is a vertical sectional view through such a motor or dynamo showing my improved terminal block in elevation; Fig. 3 is a perspective view of the particular block and block support employed in Figs. 1 and 2; and Figs. 4 and 5 illustrate modified forms.

Describing the parts by reference characters, 1 represents the frame of a small motor or dynamo and 2—2 represent the end flanges or bells one at least of which is removably secured thereto. 3 indicates the field or stator member which is generally made of sheet iron punchings assembled together and pressed into the frame. I have shown this member as provided at each side with an insulating plate 4 and transversed from end to end by bolts 5—5 whose threaded ends project through the flanges or bells and receive nuts 6 whereby the latter are secured in place. Thus far the construction is typical of many small motors.

The flanges or bells 2—2 are formed with bearings 10—10 in which is journaled the shaft 11 which carries the rotor or armature (not shown) and one of the bells or flanges is formed at one side of its bearing with an aperture 12 substantially parallel to the shaft through which projects a terminal block 13 of insulating material rigidly carried by some part of the motor interior. When bolts 5—5 are used a simple and convenient way to support this block is by means of a sheet metal bridge shown in Figs. 2 and 3, comprising end portions 14—14 apertured for the reception of the bolts and a middle portion 15 folded up and riveted to the block itself which may be of rubber, fibre, porcelain, bakelite, slate, soap stone, mica or other suitable insulating material. This bridge is best fastened in place by spacers 16 and nuts 17. In this construction the block is so mounted as to project edgewise through the opening 12 and is provided with suitable contact devices such as the binding posts 18 located so far beyond the frame as to project entirely through the flange where they can readily be manipulated after the latter is in place. A removable cover 19 is provided for the hole 12, the same being suitably apertured for the passage of the cord 20.

According to a modified construction, the bridge may be applied more nearly flatwise as shown at 24 in Fig. 4, in which case also the block 13$^a$, instead of being mounted edgewise, is arranged so as substantially to fill the opening 12$^a$ and to lie flush with the surface of the flange or bell 2, a removable cap 19$^a$ being provided as before. According to another modification of my invention the block takes the form shown in 13$^b$ in Fig. 5, projecting flat-wise through a hole 12$^b$ but formed at its inner edge with a rim 25 which contacts the inner surface of the flange 2 and dispenses with the need of a separate cover. In this case I have shown the block as supported on a spring arm 26 screwed to the inner face of the frame. It will be obvious that many other arrangements could be employed.

The wiring illustrated in Fig. 2 is primarily for an induction motor, the leads 30—30 passing to the field coils 31, and the other leads 32 being connected to starting coils (not shown). One advantage of the present arrangement is that when made in this way the different coils can be installed and their connections completed and tested before the end flanges are attached, and after the rotor or armature is installed and the end flanges attached the starting coils can be reversed so as to reverse the direction of the rotation, or speed regulating devices can be connected in circuit. When applied to a direct-current motor the connections can be so arranged as to permit the reversal of rotation or a variation of its speed, or when applied to a generator the same can be adjusted for voltage, speed, or regulation rate. It is desirable that the axis of the hole 12 should be generally parallel to that of the shaft although it need not be strictly so as shown in Figs. 4 and 5. These improvements are particularly important in connection with a rotating shaft device because of the difficulty of removing and replacing a bearing plate in such wise as to leave the bearings strictly in line, but many changes in detail can be made without departing from my inventive idea and I do not limit myself except as recited in my several claims.

Having thus described my invention, what I claim is:

1. In dynamo electric machinery, the combination with a frame having a removable end member provided with a shaft bearing and electro-magnetic coils inside said frame, said end member having a hole at one side of said bearing, of a terminal block supported interiorly of said frame independently of said end member and projecting through said hole, and contact devices carried by said terminal block and accessible from the exterior when said end member is in place.

2. In dynamo electric machinery, the combination with a stator of a terminal block rigidly mounted relatively thereto, contact devices carried by said block and having the stator terminals connected thereto, and a housing for said stator having a hole therein through which said terminal block projects to a sufficient distance to afford ready access to said contact devices.

3. In dynamo electric machinery, the combination with fixed and rotatable electro-magnetic members, of a terminal block rigidly mounted relatively to the fixed member, a housing for said members, one part of said housing being removable and having therein a bearing for the rotatable member and a hole at one side of said bearing adapted for the reception of said terminal block, said hole and bearing facing in the same general direction, and contact devices carried by that part of the terminal block which projects outside said removable member.

4. In dynamo electric machinery, in combination a frame, an end member detachably secured to said frame and having a journal bearing and a hole at one side of said bearing, a stationary electro-magnetic member inside said frame, a rotatable electro-magnetic member journaled in said bearing, a bridge member rigidly secured to spaced points of said stationary electro-magnetic member, a terminal block carried by said bridge member and projecting through said hole, contact members carried by said block accessible from the exterior of said end member, and connections between said contact members and the electro-magnetic windings, said connections being independent of said end member.

5. In dynamo electric machinery, in combination, a cylindrical casing, a stationary electro-magnetic member rigidly mounted inside the same, an apertured member fitting slidably into the end of said casing and detachably secured thereto, said member having a journal bearing whose axis is parallel to the casing axis, a shaft journaled in said bearing, a rotary electro-magnetic member carried by said shaft, a terminal block rigid with said stationary electro-magnetic member and projecting through an aperture in said apertured member, electric connections between said electro-magnetic members and a portion of said block which is accessible from the exterior of said apertured member, and a cover detachably secured to the outside of said apertured member and housing said block.

In testimony whereof, I hereunto affix my signature.

EARL B. HOFF.